US011261646B2

(12) United States Patent
Cappelli et al.

(10) Patent No.: US 11,261,646 B2
(45) Date of Patent: Mar. 1, 2022

(54) CLUTCH ASSEMBLY FOR POWERED DOOR SYSTEM

(71) Applicant: MAGNA CLOSURES INC., Newmarket (CA)

(72) Inventors: Mario Cappelli, San Giuliano Terme (IT); Sandro Bertini, Leghorn (IT); Fabio Termine, Leghorn (IT)

(73) Assignee: MAGNA CLOSURES INC., Newmarket (CA)

( * ) Notice: Subject to any disclaimer, the term of this patent is extended or adjusted under 35 U.S.C. 154(b) by 234 days.

(21) Appl. No.: 16/579,190

(22) Filed: Sep. 23, 2019

(65) Prior Publication Data
US 2020/0095819 A1  Mar. 26, 2020

Related U.S. Application Data

(60) Provisional application No. 62/735,209, filed on Sep. 24, 2018.

(51) Int. Cl.
*E05F 11/24* (2006.01)
*E05F 15/63* (2015.01)
(Continued)

(52) U.S. Cl.
CPC .............. *E05F 15/63* (2015.01); *F16H 1/06* (2013.01); *F16H 21/44* (2013.01); *B60J 5/108* (2013.01);
(Continued)

(58) Field of Classification Search
CPC .............. B60K 15/05; B60K 2015/053; B60K 2015/0576; E05B 83/34; E05B 81/25;
(Continued)

(56) References Cited

U.S. PATENT DOCUMENTS

| 4,566,570 A | 1/1986 | Geisthoff |
| 5,907,885 A * | 6/1999 | Tilli ......................... B60S 1/26 |
| | | 15/250.16 |

(Continued)

FOREIGN PATENT DOCUMENTS

| CN | 101418836 A | 4/2009 |
| CN | 201225370 Y | 4/2009 |

(Continued)

OTHER PUBLICATIONS

Chinese Office Action for related Chinese Patent Application No. 201910905142.5 dated Jan. 20, 2021.

*Primary Examiner* — Chi Q Nguyen
(74) *Attorney, Agent, or Firm* — Dickinson Wright PLLC

(57) ABSTRACT

A power actuation system for a motor vehicle closure panel includes a motor operable to pivot a driven gear. At least one pawl assembly is operably supported by the driven gear for movement between a lever driving position, whereat the pawl assembly is positioned to pivot a lever coupled to the door to pivot the door concurrently with movement of the driven gear, and a lever releasing position, whereat the pawl assembly is positioned to permit free pivotal movement of the lever and door relative to the driven gear. The pawl assembly includes a roller engaged with the lever for rolling movement therealong during movement of the pawl assembly between the lever driving position and the lever releasing position, which results in minimal static and kinetic friction, thereby lending to reliable, low effort movement of the pawl assembly between the lever driving position and the lever releasing position.

20 Claims, 17 Drawing Sheets

(51) Int. Cl.
*F16H 1/06* (2006.01)
*F16H 21/44* (2006.01)
*B60J 5/10* (2006.01)

(52) U.S. Cl.
CPC ..... *E05Y 2201/216* (2013.01); *E05Y 2201/43* (2013.01); *E05Y 2201/626* (2013.01); *E05Y 2201/71* (2013.01); *E05Y 2900/532* (2013.01)

(58) Field of Classification Search
CPC . E05F 15/63; F16H 21/44; F16H 1/06; E05Y 2201/43; E05Y 2900/531; E05Y 2800/11; E05Y 2201/216; E05Y 2900/532; E05Y 2201/712; E05Y 2201/71; E05Y 2201/626; B60J 5/108
USPC ................ 49/342, 325, 324, 349, 352, 348; 220/86.2
See application file for complete search history.

(56) References Cited

U.S. PATENT DOCUMENTS

| | | | |
|---|---|---|---|
| 5,996,754 A * | 12/1999 | Reed, Jr | F16D 21/06 192/111.18 |
| 6,155,124 A * | 12/2000 | Wirths | E05B 81/14 292/201 |
| 6,181,094 B1 | 1/2001 | Menke | |
| 6,332,518 B1 | 12/2001 | Hinterlechner | |
| 6,435,600 B1 * | 8/2002 | Long | B60J 5/06 296/155 |
| 6,439,078 B1 | 8/2002 | Schlude et al. | |
| 6,557,911 B2 * | 5/2003 | Nelsen | E05B 81/14 292/201 |
| 6,719,333 B2 * | 4/2004 | Rice | E05B 81/14 292/201 |
| 6,764,113 B1 * | 7/2004 | Cetnar | E05B 81/06 292/201 |
| 7,040,473 B2 | 5/2006 | Schachtl et al. | |
| 8,677,690 B2 * | 3/2014 | Lee | E05B 81/25 49/325 |
| 9,140,037 B2 * | 9/2015 | Nagaoka | E05B 85/02 |
| 9,174,517 B2 | 11/2015 | Scheuring et al. | |
| 9,194,162 B2 * | 11/2015 | Perkins | E05B 77/12 |
| 9,976,332 B2 | 5/2018 | Scheuring et al. | |
| 10,598,263 B2 * | 3/2020 | Martinez | F16H 19/04 |
| 2003/0089041 A1 * | 5/2003 | Daniels | E05F 15/63 49/341 |
| 2008/0250720 A1 | 10/2008 | Oxley et al. | |
| 2015/0233147 A1 * | 8/2015 | Martinez | E05B 81/25 292/142 |
| 2017/0051540 A1 | 2/2017 | Okeke et al. | |

FOREIGN PATENT DOCUMENTS

| | | |
|---|---|---|
| CN | 101550972 A | 10/2009 |
| CN | 103697087 A | 4/2014 |
| CN | 104746991 A | 7/2015 |
| CN | 209212838 U | 8/2019 |
| EP | 2039572 B1 | 9/2011 |
| EP | 1718885 B1 | 10/2012 |
| JP | H1061287 A | 3/1998 |
| JP | 2012067793 A | 4/2012 |

\* cited by examiner

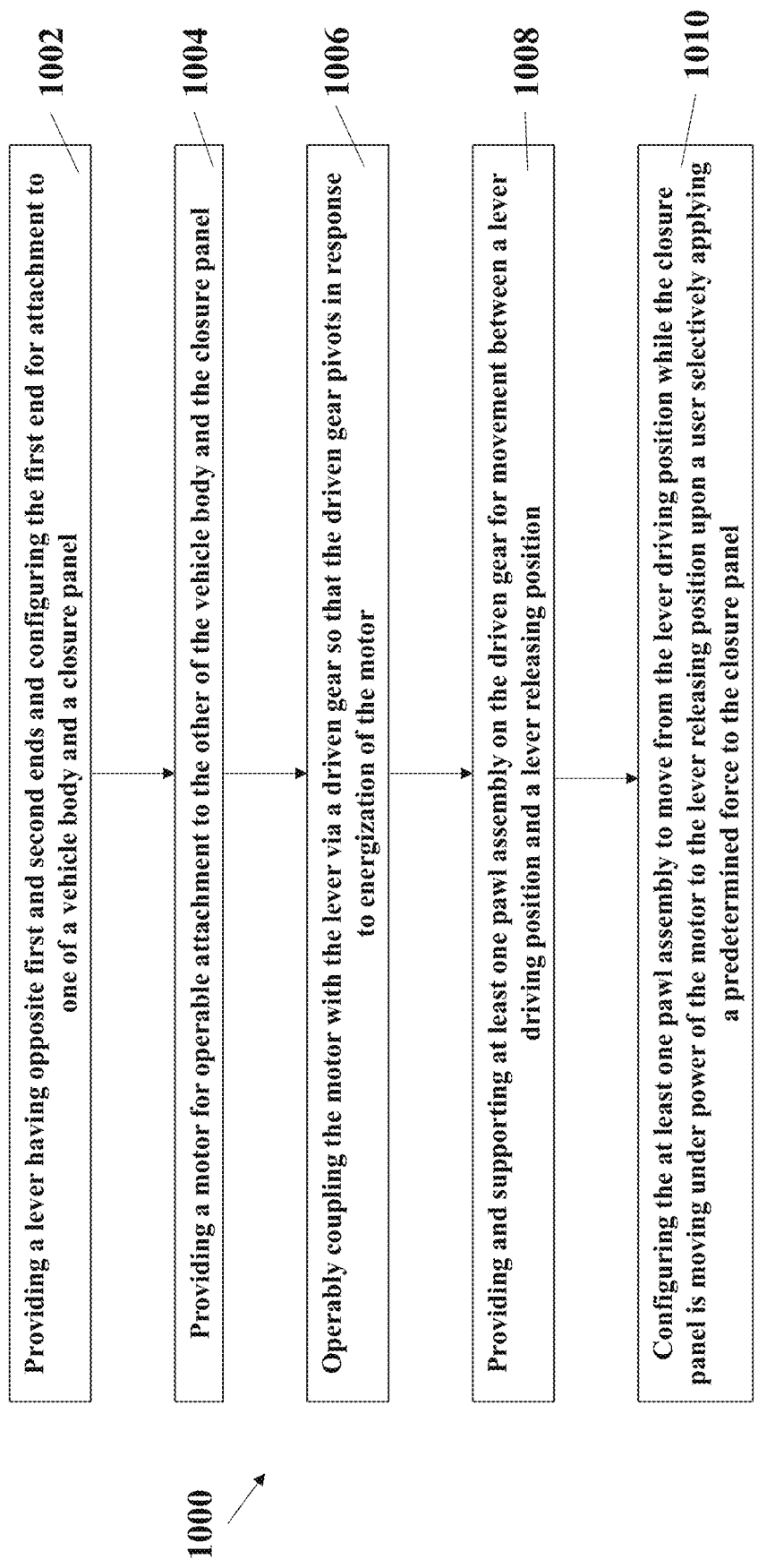

CLUTCH ASSEMBLY FOR POWERED DOOR SYSTEM

CROSS-REFERENCE TO RELATED APPLICATION

This application claims the benefit of U.S. Provisional Application Ser. No. 62/735,209, filed Sep. 24, 2018, which is incorporated herein by way of reference in its entirety.

FIELD

The present disclosure relates generally to powered actuation systems for motor vehicle closure panels. More specifically, the present disclosure is directed to motor vehicle closure panel powered actuation systems having a mechanically actuatable override clutch assembly.

BACKGROUND

This section provides background information related to the present disclosure which is not necessarily prior art.

In view of increased consumer demand for motor vehicles equipped with advanced comfort and convenience features, many current vehicles are now provided with power actuated systems operable via passive keyless entry systems, or sensor systems, to permit powered actuation (opening and/or closing) of a closure panel, e.g. liftgate, door, hood, trunk lid, or otherwise. Although such power actuated systems provide desired functionality to the closure panel under normal operating conditions, sometimes it becomes desired to be able to "override" the power actuated system to interrupt or otherwise alter the automated movement of the closure panel. For example, it may be desired to suddenly stop the automated movement of the closure panel if the closure panel is about to impact an object, or upon the closure panel impacting an object without harming the closure panel and the impacted object, or it may be desired to suddenly accelerate and/or reverse the direction of movement of the closure panel, all without causing damage to components of the power actuated system.

Accordingly, what is needed is a powered actuation system that includes a mechanically actuatable clutch assembly that is reliable (regardless of surface finish deterioration of internal components of the powered actuation system and regardless of environmental conditions, e.g. temperature), lightweight, has relatively few operable components, thereby being economical, and exhibits a long a useful life.

As such, while commercially-available powered actuated systems for vehicle closure panels are satisfactory to meet all operational and regulatory requirements, a recognized need exists to advance the technology and provide optimized powered actuated systems having a reliable and easy-to-actuate manual override/actuation clutch mechanism that is efficient in use, cost efficient in manufacture and assembly and that minimizes package size and weight.

SUMMARY

This section provides a general summary of the disclosure and is not intended to be interpreted as a comprehensive and exhaustive listing of its full scope or all of its aspects, features and structured configurations.

It is an aspect of the present disclosure to provide a powered actuation system for a vehicle closure panel having a power release mechanism and a manually actuatable clutch assembly that address at least those issues discussed above.

It is a related aspect of the present disclosure to provide a powered actuation system for a vehicle closure panel having a power release mechanism and a manually actuatable clutch assembly, wherein the power release mechanism automatically detects when the manually actuatable clutch assembly is actuated by a predetermined magnitude of force, thereby allowing the power release mechanism to be automatically deactivated.

In a related aspect, to provide a powered actuation system for a vehicle closure panel having a power release mechanism and a mechanical clutch assembly that is reliably actuatable upon encountering a predetermined force having a minimal range of variability over its useful life.

In accordance with these and other aspects, a power actuation system for a closure panel of a motor vehicle is provided. The power actuation system includes a mount member, configured for attachment to one of a vehicle body of the motor vehicle and the closure panel, and a lever, having a first end and an opposite second end, with the first end being configured for attachment to the other of the vehicle body of the motor vehicle and the closure panel from the mount member. The lever is pivotably mounted on the mount member between the first end and the second end. The driven gear is pivotably mounted on the mount member. A motor is configured for attachment to the same one of the vehicle body of the motor vehicle and the closure panel as the mount member. The motor is operably coupled with a gear member to rotate the gear member in response to energization of the motor. The gear member is configured in meshed engagement with the driven gear to pivot the driven gear in response to rotation of the gear member. At least one pawl assembly is pivotally supported on the driven gear by a pawl rivet for movement between a lever driving position, whereat the pawl assembly is positioned to engage a portion of the lever adjacent the second end of the lever and pivot the lever concurrently with the driven gear in response to pivotal movement of the driven gear, and a lever releasing position, whereat the pawl assembly is pivoted to permit free pivotal movement of the lever relative to the driven gear. The pawl assembly is biased toward the lever driving position and includes a carrier supporting a roller. The roller engages the portion of the lever adjacent the second end of the lever for rolling movement along the portion during movement of the pawl assembly between the lever driving position and the lever releasing position. The rolling movement of the roller along the portion of the lever results in minimal static and kinetic friction, thereby lending to reliable movement of the pawl assembly between the lever driving position and the lever releasing position upon application of a minimal manual effort, as desired, substantially independent of environmental conditions and any surface deterioration of components parts.

In accordance with a further aspect, the portion adjacent the second end of the lever can include a notch configured for receipt of a select one of the at least one pawl assembly, wherein the notch is recessed into the second end along a side of the lever and is configured to facilitate smooth rolling motion of the roller therealong during movement of the pawl assembly between the lever driving position and the lever releasing position.

In accordance with a further aspect, the at least one pawl assembly can includes a pair of pawl assemblies, thereby providing the power actuation system with an ability to drive the closure panel under power from a closed position to an open position via a first pawl assembly and from the open position to the closed position via a second pawl assembly, while also providing an ability to selectively manually override the powered movement during movement of the closure panel toward both the closed and open positions.

In accordance with a further aspect, the pair of pawl assemblies can be located on opposite sides of the lever, wherein one of the pawl assemblies is positioned to engage the portion of the lever adjacent the second end of the lever along a first side of the lever and pivot the lever in a first direction concurrently with the driven gear in response to pivotal movement of the driven gear in a first pivot direction and the other of the pawl assemblies is positioned to engage the portion of the lever adjacent the second end of the lever along a second side of the lever oppositely facing the first side and pivot the lever in a second direction opposite the first direction concurrently with the driven gear in response to pivotal movement of the driven gear in a second pivot direction opposite the first pivot direction.

In accordance with a further aspect, one of the lever and the driven gear can be provided with an upstanding pin and the other of the lever and the driven gear can be provided with a slot, with the upstanding pin being disposed within the slot for translation therein during pivotal movement of the lever while the pawl assembly is in the lever releasing position, such that the slot is sufficiently elongate to allow the freedom of relative pivotal movement between the lever and the driven gear when desired to override powered movement of the closure panel.

In accordance with a further aspect, one of the lever and the mount member has an upstanding protrusion and the other of the lever and the mount member has an arcuate slot, with the upstanding protrusion being disposed within the arcuate slot for translation therein to facilitate pivotal movement of the lever relative to the mount member.

In accordance with a further aspect, the roller can be provided being a spherical ball to promote generation of minimal static and kinetic rolling friction between the roller and the lever.

In accordance with a further aspect, the carrier can be provided having an elongate slot configured for captured translation of the roller therein, thereby preventing the roller from separating from the carrier, while allowing free translation of the roller therein to facilitate pure rolling of the roller along the second end of the lever.

In accordance with a further aspect, a method for providing manual interruption of a powered vehicle closure panel that is pivotally coupled to a vehicle body as the closure panel is moving under power between open and closed positions is provided. The method includes providing a lever having a first end and an opposite second end and configuring the first end for attachment to one of the vehicle body and the closure panel. Further, providing a motor and configuring the motor for operable attachment to the other of the vehicle body and the closure panel. Further yet, operably coupling the motor with the lever via a driven gear so that the driven gear pivots in response to energization of the motor. Additionally, providing at least one pawl assembly and supporting the pawl assembly on the driven gear for movement between a lever driving position, whereat the pawl assembly is positioned to pivot the lever in response to pivotal movement of the driven gear, and a lever releasing position, whereat the pawl assembly is positioned to permit free pivotal movement of the lever relative to the driven gear, and configuring the pawl assembly to move from the lever driving position while the closure panel is moving under power of the motor to the lever releasing position upon an obstacle or a user selectively applying a predetermined force (a pre-calculated force sufficient to move the pawl assembly to the lever releasing position) cause to the closure panel.

In accordance with a further aspect, the method can further include providing the pawl assembly having a roller configured for rolling engagement with the lever as the pawl assembly moves between the lever driving position and the lever releasing position, wherein the roller results in minimal friction between the pawl assembly and the lever during relative movement therebetween, regardless of environmental and component conditions, thus, resulting in reliable and repeatable selective movement of the pawl assembly between the lever driving position and the lever releasing position, as desired.

In accordance with another aspect, there is provided a clutch assembly for a power actuation system for a closure panel of a motor vehicle, the clutch assembly being configured to engage and disengage a lever and a drive member driven by a motor, with the lever having a first end and a second end opposite the first end, the first end being configured for attachment to one of a vehicle body of the motor vehicle, and the closure panel and the driven member being configured for attachment to the other of the vehicle body of the motor vehicle and the closure panel. The clutch assembly comprises: at least one ratchet provided on a portion of the lever adjacent the second end of the lever; and at least one pawl assembly supported on the driven member for movement between: a lever driving position whereat the pawl assembly is positioned to engage the at least one ratchet and move the lever concurrently with the driven member in response to movement of the driven member by an energization of the motor, and a lever releasing position whereat the pawl assembly is moved out of engagement with the ratchet upon exceeding a predetermined force applied to the pawl assembly and the ratchet greater than a force maintaining the at least one pawl assembly in the lever driving position to permit free movement of the lever relative to the driven member.

In accordance with a further aspect, there is provided a power actuation system for a closure panel of a motor vehicle, comprising: a lever having a first end and an opposite second end, with the first end being configured for attachment to one of a vehicle body of the motor vehicle and the closure panel, and with the opposite second end comprising at least one ratchet provided adjacent the second end; a driven member mounted on the other one of the vehicle body of the motor vehicle and the closure panel; an actuator configured for attachment to the same one of the vehicle body of the motor vehicle and the closure panel as the driven member, with the actuator being operably coupled with the driven member to move the driven member in response to actuation of the actuator; and at least one pawl assembly supported on the driven member for movement between: a lever driving position whereat the pawl assembly is positioned to engage the at least one ratchet and move the lever concurrently with the driven member in response to movement of the driven member by the actuator, and a lever releasing position whereat the pawl assembly is disengaged from the ratchet to permit free movement of the lever relative to the driven member, the pawl assembly being biased toward the lever driving position and being disengagable from the ratchet upon a force generated by one of the closure panel and the motor applied to one of the pawl assembly and the ratchet exceeding a predetermined threshold.

BRIEF DESCRIPTION OF THE DRAWINGS

These and other aspects, features, and advantages of the present disclosure will be readily appreciated, as the same becomes better understood by reference to the following non-limiting detailed description when considered in connection with the accompanying drawings, wherein:

FIG. 18 illustrates a sequence of a method for providing manual interruption of a powered vehicle closure panel as the closure panel is moving under power between open and closed positions.

Corresponding reference numerals are used throughout all of the drawings to identity common components.

DETAILED DESCRIPTION OF EXAMPLE EMBODIMENTS

Figure 1:
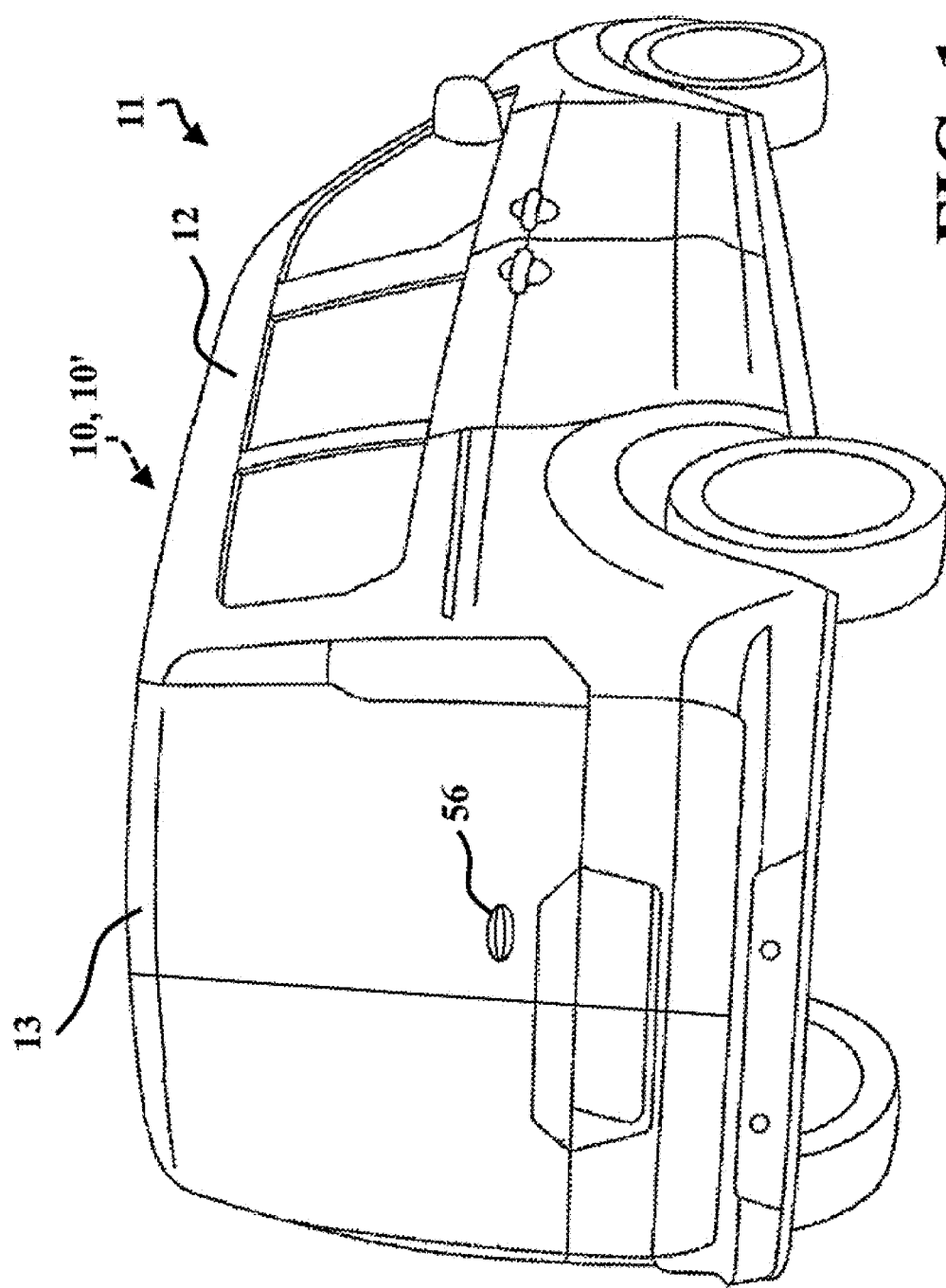
FIG. 1 is a perspective view of a motor vehicle equipped with a powered actuation system configured in operable communication with a closure panel in accordance with an aspect of the disclosure.

In general, example embodiments of a power actuation system constructed in accordance with the teachings of the present disclosure for a closure panel of a motor vehicle will now be disclosed. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail, as they will be readily understood by the skilled artisan in view of the disclosure herein.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Reference is made to FIG. 1, which shows a motor vehicle 11 that has a closure panel, such as a rear door, and referred to hereafter simply as door 13, by way of example and without limitation, that is pivotably attached to a vehicle body 12 of the motor vehicle for pivoting movement between a closed position and an open position, wherein the motor vehicle 11 has a powered actuation system, referred to hereafter as actuation system 10, constructed in accordance with an aspect of the disclosure attached, configured for powered actuation to move the door 13 from the closed position to the open position and/or from the opening position to the closed position. During powered movement of the door 13 via the actuation system 10, the powered movement of the door 13 can be selectively interrupted via application of a manually applied force to the door 13, such as by a person and/or object, as discussed in further detail below. Then, upon interrupting the powered movement of the door 13, the door 13 can be freely manually pivoted toward the desired open and/or closed position, if desired, whereupon the powered actuation system 10 can be selectively and/or automatically reset, for example by a user manually moving door 13 to re-align the pawl 26 with the notch 50, or by actuation of the motor 32 in a manner as will be detailed herein below, to allow the door 13 to resume being powered for movement between the open and closed positions.

A more detailed description of a non-limiting example of an actuation system 10, constructed in accordance with the teachings of the present disclosure, will now be provided.

Figure 2:
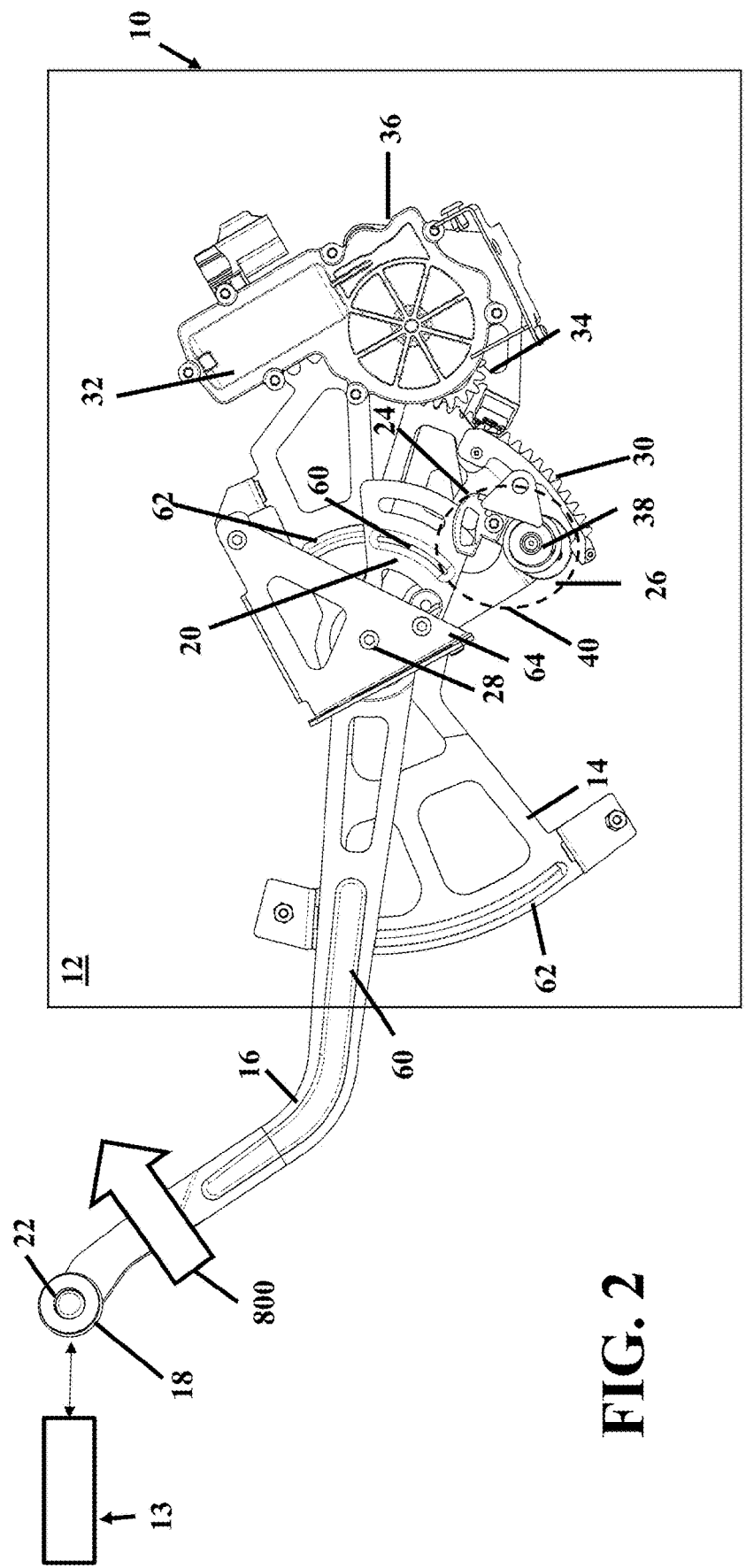
FIG. 2 is a plan view of a powered actuation system, constructed in accordance with one aspect of the disclosure, of the motor vehicle of FIG. 1.

As shown in a non-limiting embodiment in FIG. 2, the actuation system 10 can include a mount plate, also referred to as mount member 14, that is configured for attachment to one of the vehicle body 12 and the door 13, shown, by way of example and without limitation, as the vehicle body 12, and an elongate lever 16 that is configured for attachment to the other of the vehicle body 12 and the door 13, shown, by way of example and without limitation, as the door 13. The elongate lever 16, also referred to as an extendable member, may include a pivoted lever as described herein moveable to assist with opening and closing the door 13, but may include other moveable mechanisms provided between the vehicle body 12 and the door 13 such as a sliding or telescoping extensible member, rotatable extensible member such as leadscrews, a geared configuration, or other types of levers.

Figure 7:
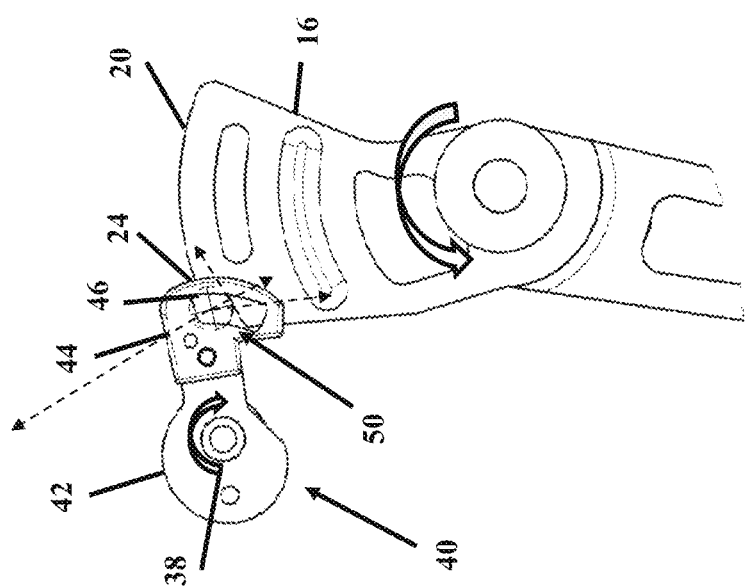
FIG. 7 is an enlarged schematic plan view of a mechanically actuatable clutch assembly engaged in a fully coupled position with a ratchet end of a lever of a power actuation system constructed in accordance with an aspect of the disclosure.
Figure 9:
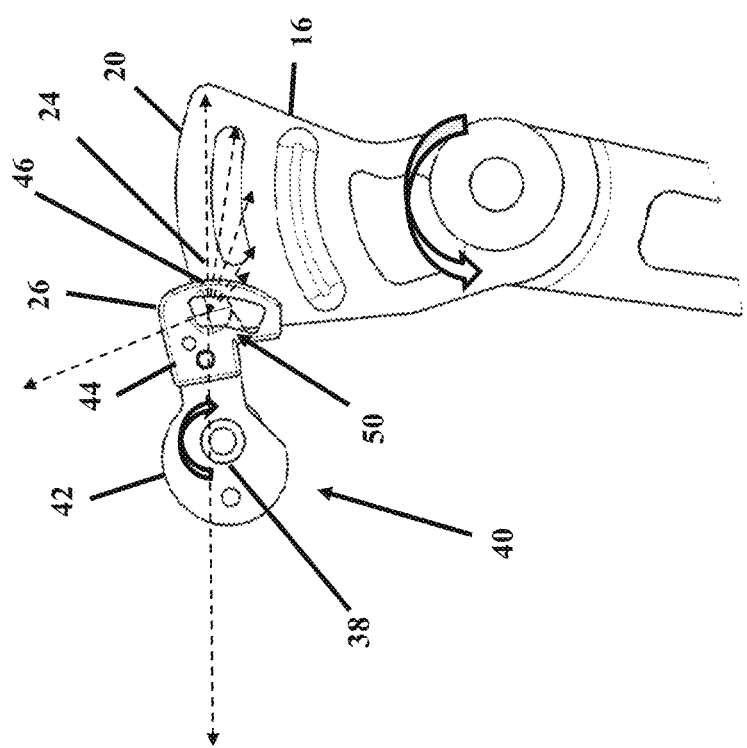
FIG. 9 is a view similar to FIG. 8 illustrating continued application of a force by the ratchet end against the roller of the pawl due to continued force being manually applied to the lever of the power actuation system.

It is recognized that the extendable member may be a rotational type member, or a linear type, or otherwise, and that the clutch assembly while described as having a rotational input and output, may be configured otherwise such as linear clutch. The lever 16 extends lengthwise between a first end 18, also referred to as output end, and an opposite second end 20, also referred to as input end, with the first end 18 shown as being attached via a pivotal hinge or joint 22 to the door 13. The second end 20 is a free end, wherein a ratchet portion immediately adjacent the second end 20, referred to hereafter as output device, ratchet or ratchet portion 24, is configured for operable, direct or indirect, engagement with a pawl assembly 26, also referred to as input device, discussed in more detail hereafter. The lever 16 is pivotably mounted on the mount member 14 between the first end 18 and the second end 20, such as via a pin 28, such that in use, the lever 16 pivots about a central axis of pin 28 as the door 13 swings between closed and open positions. A sector gear member, also referred to as output gear member, output or driven gear 30, is mounted for pivotal movement, such as on the mount member 14 via the pin 28, by way of example and without limitation. As such, the lever 16 and driven gear 30 can be configured to pivot about the same central axis of pin 28, as discussed further below. An actuator motor, referred to hereafter simply as motor 32, is configured for attachment to the same one of the vehicle body 12 and the door 13 as the mount member 14, shown as the vehicle body 12, by way of example and without limitation. In the depicted non-limiting embodiment, the motor 32 is shown as being mounted to the mount member 14, thereby facilitating assembly of the actuation system 10 to the motor vehicle 11. The motor 32 is operably coupled with an input gear member, also referred to as input or gear member 34, either directly or via a drive gear 36, thereby rendering the gear member 34 as an idler input gear, to rotate the gear member 34 in response to actuation via energization of the motor 32 and gear member 34 receiving a driving force, such as a torque output, outputted by the motor 32 in response to energization. The gear member 34 is configured in meshed engagement with gear teeth of the sector-shaped driven gear 30 to pivot the driven gear 30 about pin 28 in response to selectively driven rotation of the gear member 34. At least one aforementioned pawl assembly 26 is pivotally supported and disposed between the gear member 34 and the lever 16 for movement with the driven gear 30, wherein driven gear 30 can be mounted for pivotal movement by a pawl rivet 38 for movement between a lever driving position (FIGS. 7-8) and a lever releasing position (FIGS. 15-17), thereby operably coupling driven gear 30 to lever 16 via pawl assembly 26. While in the lever driving position, the pawl assembly 26 is positioned to engage and drive the ratchet portion 24 of the lever 16 immediately adjacent the second end 20 of the lever 16 and pivot the lever 16 concurrently with pivotal movement of the driven gear 30 in direct response to energization of motor 32 and pivotal movement of the driven gear 30. Conversely, while in the lever releasing position, the pawl assembly 26 is pivoted out of driving engagement with the ratchet portion 24 to permit free pivotal movement of the lever 16 relative to the driven gear 30, regardless of the operational state of motor 32, thereby allowing the powered actuation of the actuation system 10 to be manually overridden.

Figure 2A:
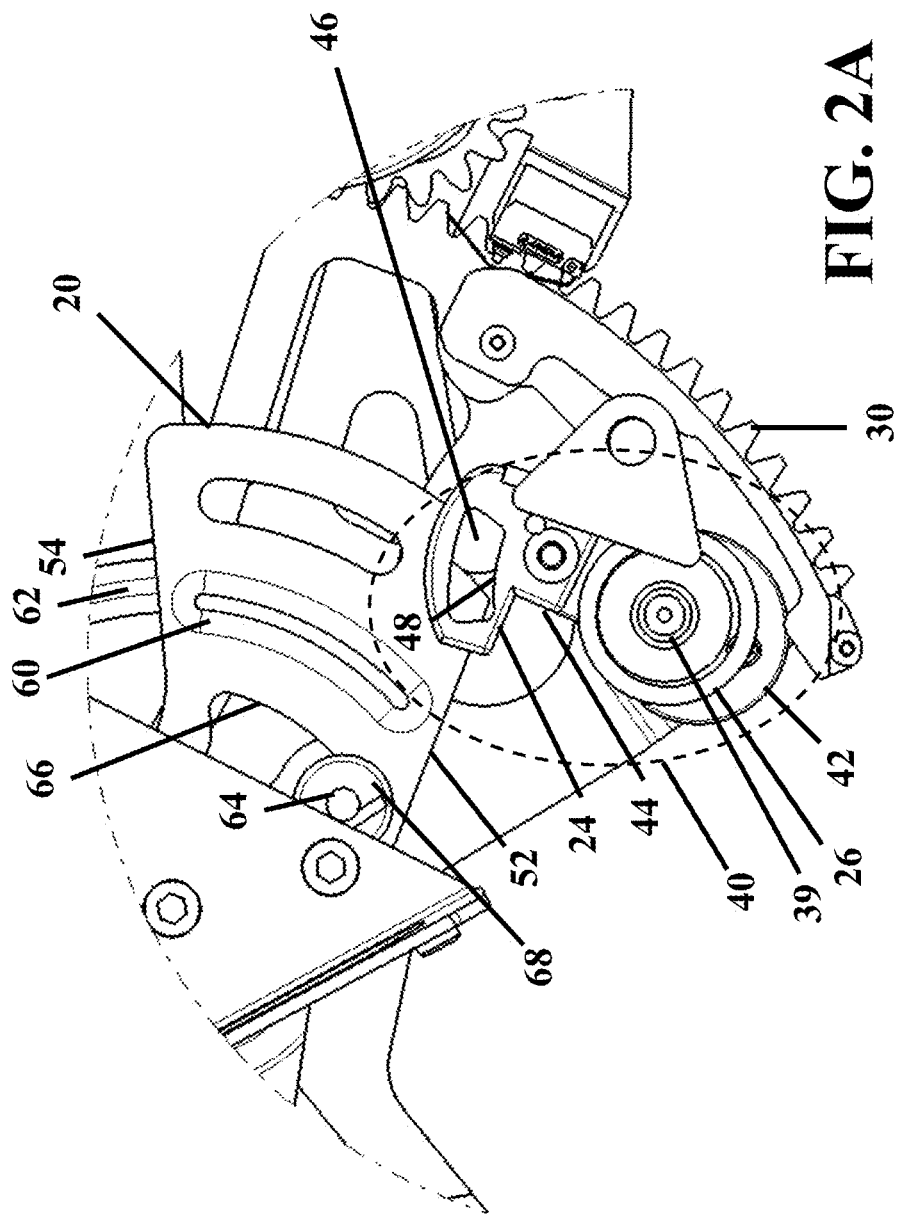
FIG. 2A is an enlarged view of the powered actuation system of FIG. 2 illustrating a mechanically actuatable clutch assembly thereof.
Figure 5:
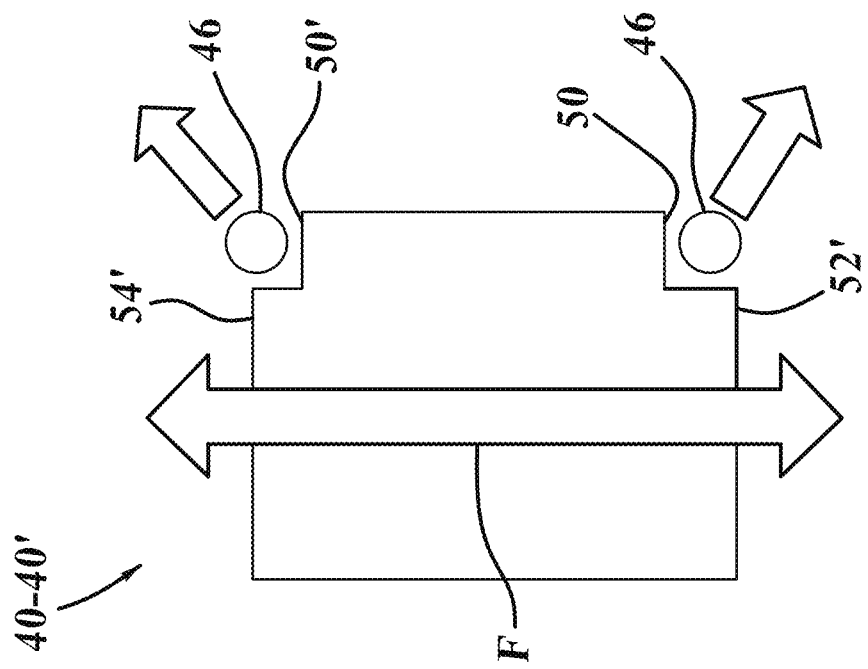
FIG. 5 is a schematic illustration of a mechanically actuatable clutch assembly of the powered actuation system of FIG. 4 being actuatable in two directions.
Figure 3:
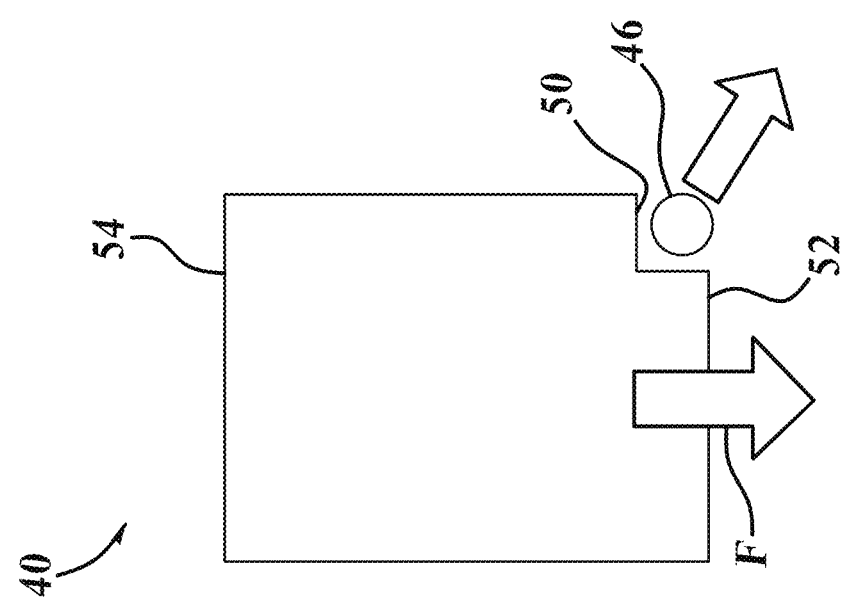
FIG. 3 is a schematic illustration of the mechanically actuatable clutch assembly of FIG. 2 being actuatable in one direction.
Figure 4:
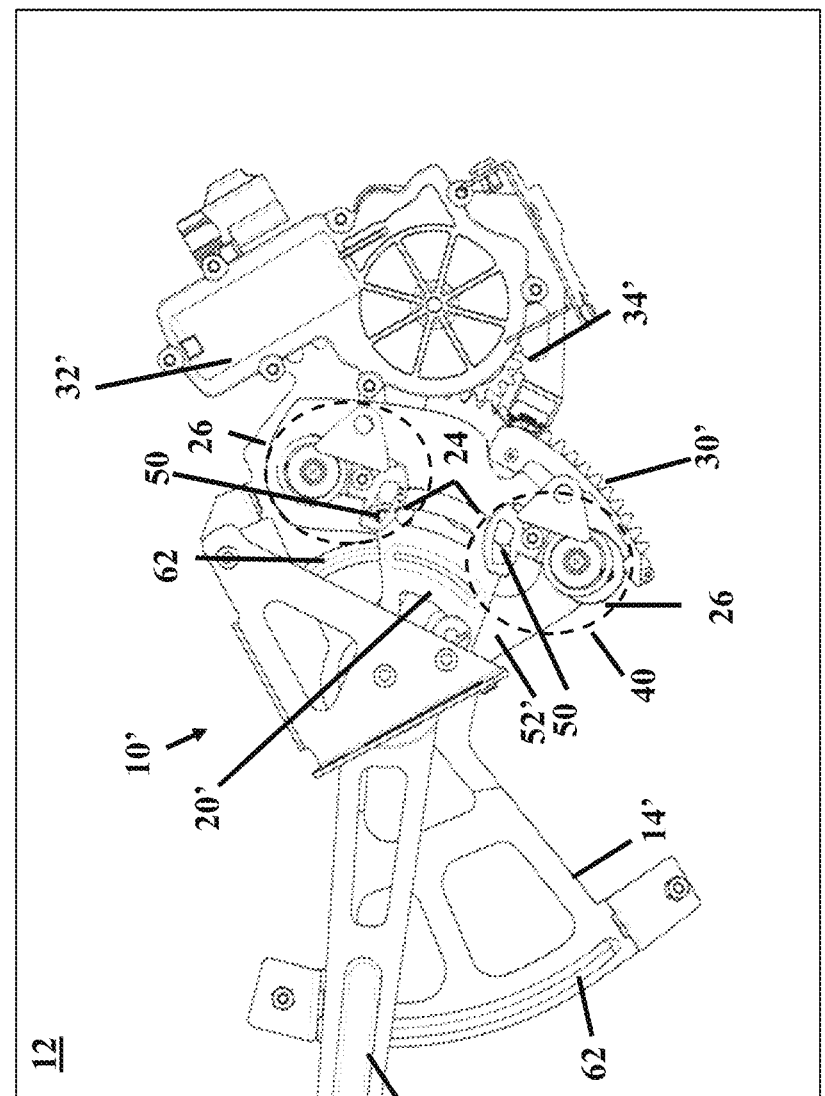
FIG. 4 is a view similar to FIG. 2 of a powered actuation system, constructed in accordance with another aspect of the disclosure, of the motor vehicle of FIG. 1.
Figure 13:
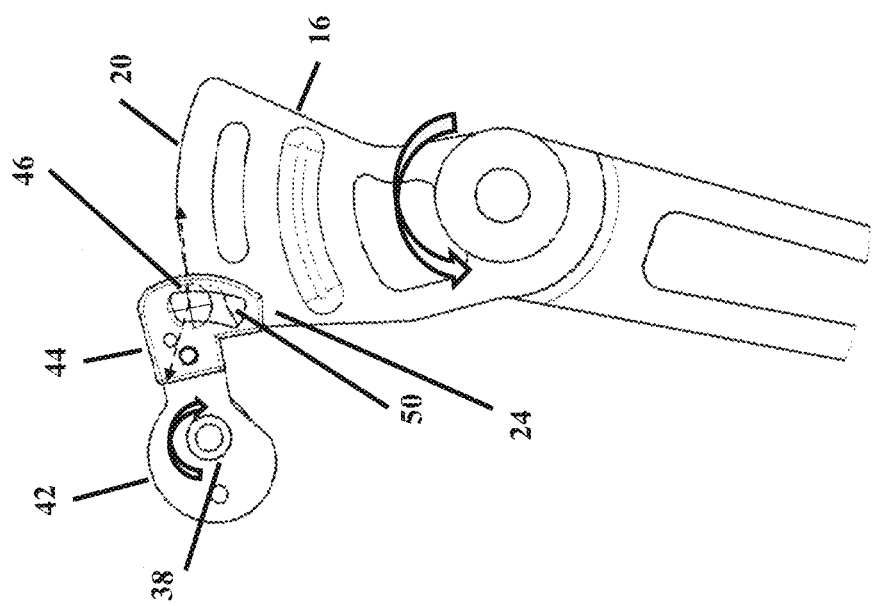
Figure 14:
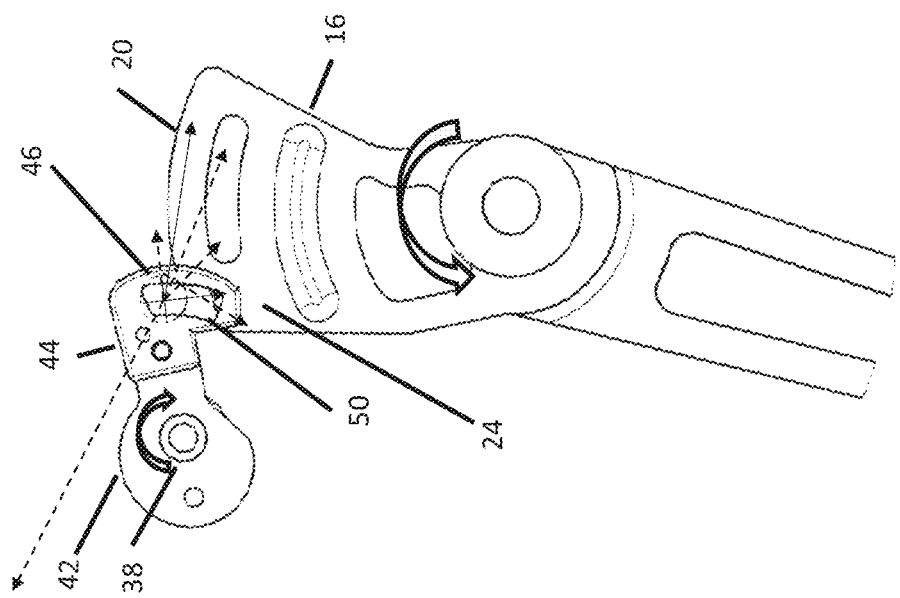
FIG. 14 is a view similar to FIG. 13 illustrating the roller being rolled outwardly from the notch of the lever of the power actuation system due to continued application of a force by the ratchet end against the roller of the pawl as a result of continued force being manually applied to the lever of the power actuation system.
Figure 15:
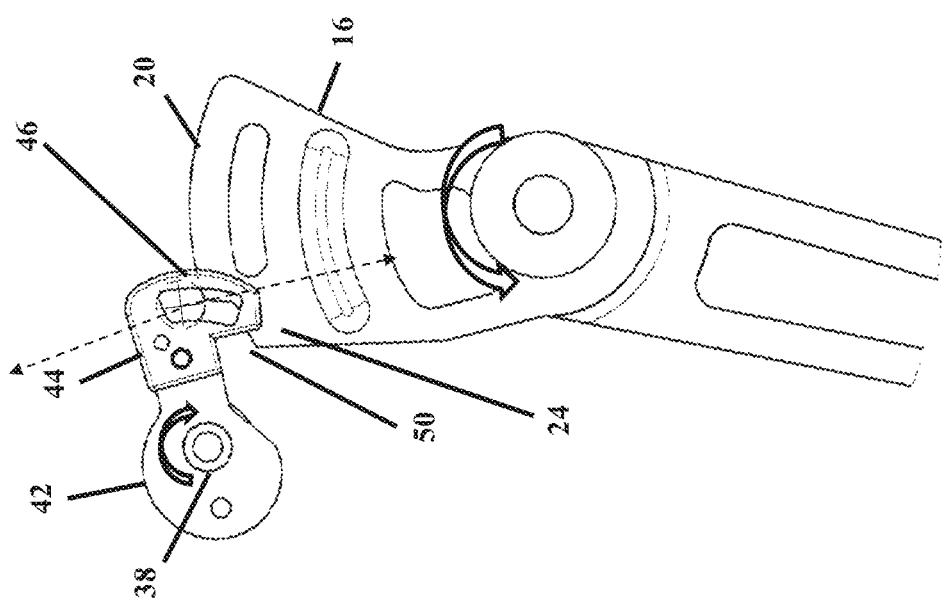
FIGS. 15-17 are views similar to FIG. 14 illustrating the roller continuing to roll along an end surface of the lever of the power actuation system due as a result of continued force being manually applied to the lever of the power actuation system.
Figure 16:
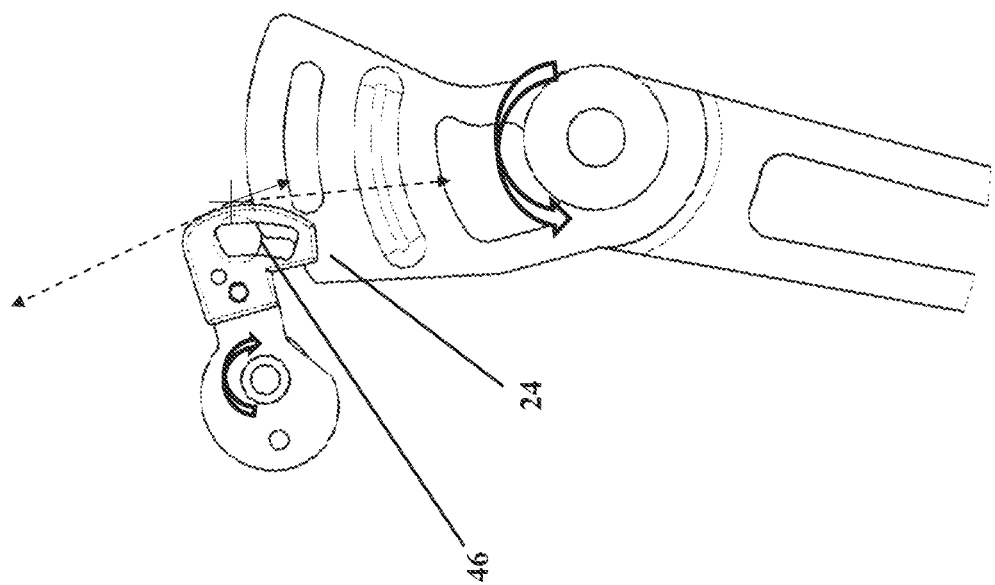
Figure 17:
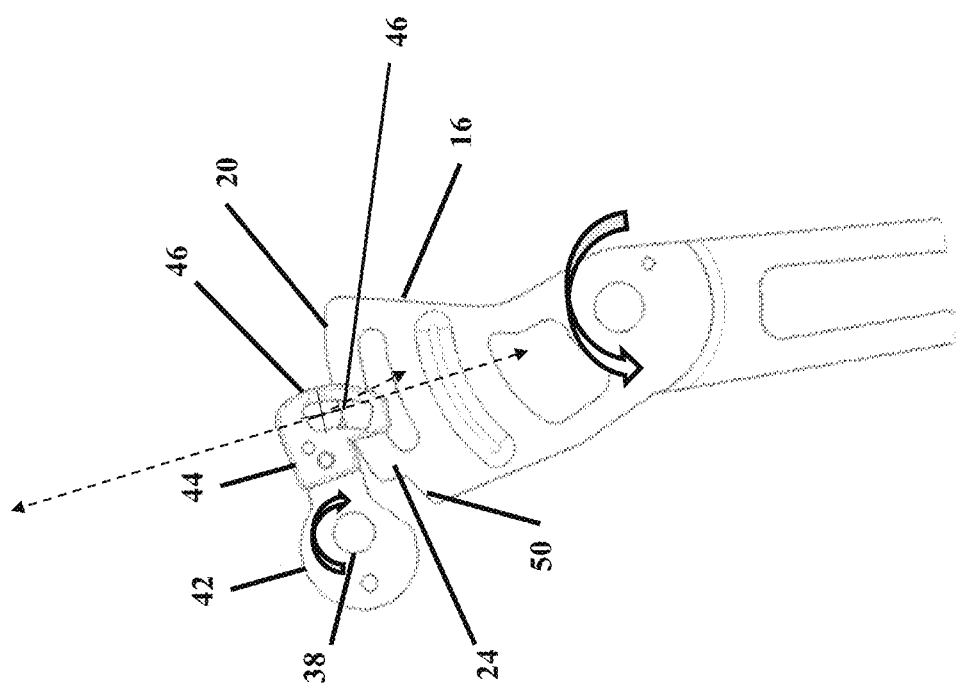

The pawl assembly 26 is biased toward the lever driving position, such as via a spring member 39 (FIG. 2A) of pawl assembly 26, and thus, unless manually overridden by a sufficient, predetermined manually applied force (intended to mean a force that is pre-calculated and built into a clutch assembly 40 disposed between the input gear member 34 and the lever 16, wherein clutch assembly 40 includes at least the ratchet portion 24 and the pawl assembly 26, wherein the pre-calculated force remains generally constant over the useful life of the actuation system 10, regardless of environmental conditions, wear and surface deterioration of component parts), the pawl assembly 26 remains in the lever driving position in driving, seated relation with ratchet portion 24. As best shown in FIG. 2A, the pawl assembly 26 includes a pawl arm 42 and a carrier 44 fixed to the pawl arm 42, with the carrier 44 being configured to support and maintain a follower, also referred to as input, pawl roller or roller 46 (roller 46 can be a spherical ball, a cylinder or barrel shaped member, by way of example and without limitation) for rolling movement within carrier 44 during manual override of a powered actuation of actuation system 10, as discussed further hereafter. Carrier 44 can be constructed of a pair of generally planar plates fixed to opposite sides of pawl arm 42 in parallel relation with one another, such as via a rivet or other suitable fastener, or carrier 44 can be constructed as a single piece of material, if desired, as will be appreciated by one possessing ordinary skill in the art. Carrier 44 has a slot 48 configured for retention and translation of the roller 46 therein, wherein slot 48 is shown as being provided in opposite sidewalls of carrier 44, with the slot 48 having a width less than a diameter of the roller 46, which is shown as being a spherical ball 46. The input or roller 46 engages the output or ratchet portion 24 adjacent the second end 20 of the lever 16 for rolling movement along the ratchet portion 24 during movement of the pawl assembly 26 between the lever driving position (FIGS. 7-8) and the lever releasing position (FIGS. 15-17). The pure or substantially pure (intending to mean that a slight about of sliding may occur, through the vast and substantial majority of motion is rolling) rolling movement of the roller 46 along the ratchet portion 24 of the lever 16 results in minimal static and kinetic friction, thereby lending to reliable and repeatable movement of the pawl assembly 26 between the lever driving position and the lever releasing position upon application of a minimal manual force F to door 13 and lever 16, as desired. The ratchet portion 24 adjacent the second end 20 of the lever 16 can include a detent, also referred to as notch 50 (FIG. 7), configured for receipt of the roller 46 while the pawl assembly 26 is in the lever driving position. Dashed lines in FIG. 7 to FIG. 16 illustrate the forces acting on the roller 46 and the ratchet (24) during a disengagement sequence operation. The notch 50 is recessed into the second end 20 along one of a pair of sides 52, 54 of the lever 16 in a one-way clutch assembly 40 embodiment, shown as being recessed in side 52 (FIGS. 2A and 3), while a pair of notches 50, 50' are recessed into both the opposite sides 52', 54' adjacent a second end 20', opposite first end 18', of a lever 16' of a two-way clutch embodiment that includes a first clutch assembly 40 and a second clutch assembly 40' (FIG. 4). It is to be recognized that the 2-way clutch embodiment is similar to the one-way clutch assembly 40, only rather than the clutch assembly having a single pawl assembly 26, a pair of pawl assemblies 26, 26' are included in clutch assembly, with the pawl assemblies 26, 26' each being the same as discussed above for pawl assembly 26. The notable difference being that the two-way clutch assembly 40' provides for manual overriding of the powered movement of door 13 in both opening and closing operations, as opposed to solely overriding the powered opening operation of the door 13 with the one-way clutch assembly 40, as discussed further below.

Figure 6:
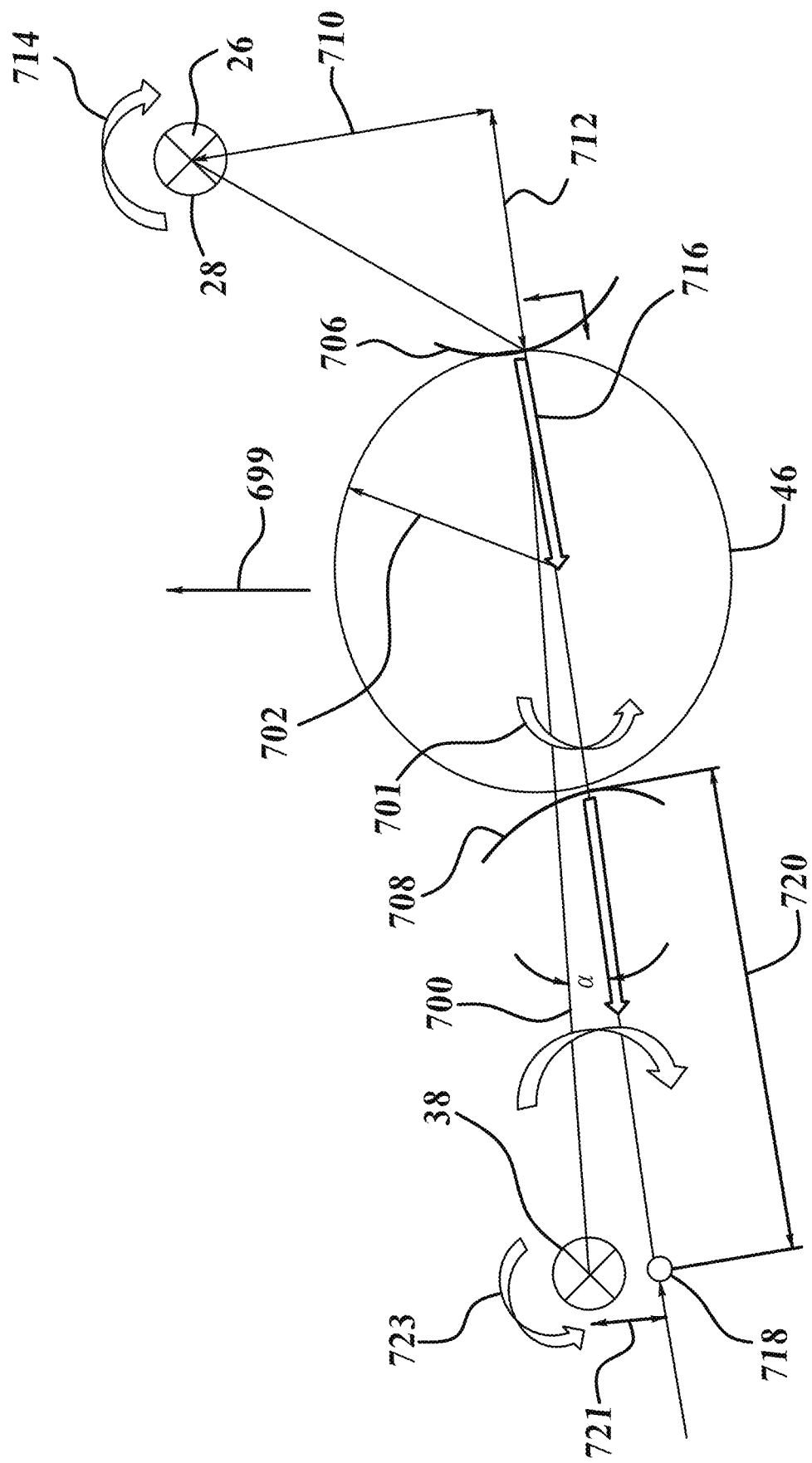
FIG. 6 is a schematic diagram illustrating dimensional relationships of various components of the mechanically actuatable clutch assemblies of the powered actuation systems of FIGS. 2 and 4.

Referring to FIG. 6, the action forces on the roller 46, illustrated as a sphere, act to impart a rolling or sphere rotation 701 in a direction 699 without sliding between the surfaces 706, 708 respectively of the ratchet 24 and pawl assembly 26 and which may be assured by the angle 700 being less than a minimum static friction angle. Roller 46 includes a sphere radius 702. Ratchet surface 706 rotatable about pivot pin 28 can be defined relative to pivot pin 26 in terms of dimensional components lever arm 710, and lever length 712, and a lever moment 714 acting on ratchet 24 about pivot pin 26. Action force 716 acting through center of roller 46 towards a center of the pawl profile 718 is illustrated. Pawl assembly 26 is shown to have a pawl length 720 extending from the center of the pawl profile 718. Pawl assembly 26 rotatable about pawl pin 38 which is distance from the center of the pawl profile 718 by a pawl arm 721. Pawl spring 39 imparts pawl spring bias cause a spring reaction moment 723 about pawl in 38 shown in a counter-clockwise direction.

Figure 8:
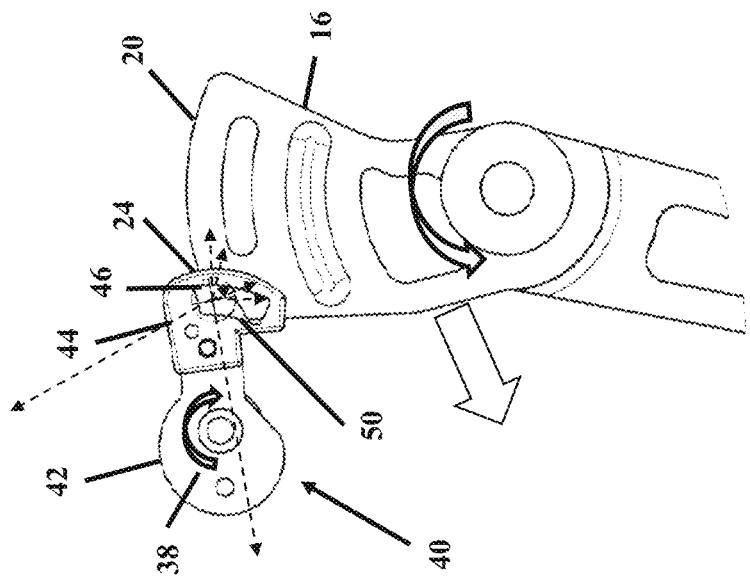
FIG. 8 is a view similar to FIG. 7 illustrating initial application of a force by the ratchet end against a roller of a pawl of the clutch assembly resulting from a force being manually applied to the lever of the power actuation system.

In use, the motor 32 can be actuated via an outside door handle 56 and/or via a key fob 58, for example, sensing both the presence of a key fob 58 and that door handle 56 has been actuated (e.g. via communication between a switch (not shown) and an electronic control unit (ECU, not shown) that at least partially controls the operation of actuation system 10. In turn, ECU actuates motor 32 to cause the input end 20, and for example gear member 34 to be rotatably driven, thereby causing output or driven gear 30 to be pivoted about pin 28. Then, in a normal powered operative use, wherein the door 13 is allowed to be opened under the powered movement of the actuation system 10, the pivoting movement of driven gear 30 causes input or roller 46 of pawl assembly 26 to rotatably drive output or ratchet portion 24 of lever 16 via engagement with the notch 50 of ratchet portion 24, wherein the force applied by pawl assembly 26 to the ratchet portion 24 overcomes a bias imparted on lever 16, tending to pivot lever 16 toward pawl assembly 26 (FIG. 8). Engagement together of the input or roller 46 of pawl assembly 26 with ratchet portion 24 of lever 16 via engagement with the notch 50 of ratchet portion 24 illustratively engages together, or selectively connects, the input end 20 with the output end 18. The pawl assembly 26, and in particular the roller 46 thereof, continues to push on ratchet portion 24 within notch 50, such that roller 46 and ratchet portion 24 move conjointly with one another in an engaged state until lever 16 is fully pivoted in a counter clockwise direction (CCW), as viewed in FIG. 2, such that the door 13, which is coupled to end 18 of lever 16 via joint 22, is caused to move from its closed position to its open position. During pivotal movement of lever 16, lever 16, aside from being pivotally fixed to mount member 14 by pin 28, can be stabilized for pure and reliably guided pivotal movement by one of the lever 16 and the mount member 14 having at least one upstanding protrusion 60, shown as the lever 16 having a pair of upstanding protrusions 60 located on opposite sides of pin 28 from one another, by way of example and without limitation, and the other of the lever 16 and the mount member 14 having a corresponding number of arcuate slot(s), also referred to as recess(es) 62, shown as the mount member 14 having a pair of recesses 62, by way of example and without limitation. With the upstanding protrusions 60 being disposed for guided translation within the recesses 62, reliable pivotal movement of the lever 16 relative to mount member 14 is assured.

Then, when desired to power the door 13 to the closed position, the motor 32 can again be actuated to rotate the gear member 34 in an opposite CCW direction to that when opening the door 13, such that the gear member 34 drives driven gear 30 and pivots lever 16 in a CW direction to close door 13. To facilitate power driven CW movement of the lever 16 in response to power driven CW movement of driven gear 30, one of the lever 16 and the driven gear 30 has an upstanding pin 64, shown as the driven gear 30, by way of example and without limitation, and the other of the lever 16 and the driven gear 30 has a slot 66, shown as the driven gear 30, by way of example and without limitation, wherein the upstanding pin 64 is disposed within the slot 66 for engagement with an end surface 68 (hidden beneath pin 64 in FIG. 2A) of slot 66 during powered movement of lever 16. Accordingly, as driven gear 30 is powered in the CW direction, pin 64, being in engagement with end surface 68, drives lever 16 in CW pivotal relation about pin 28 to move the door 13 under power to the closed position.

Figure 10:
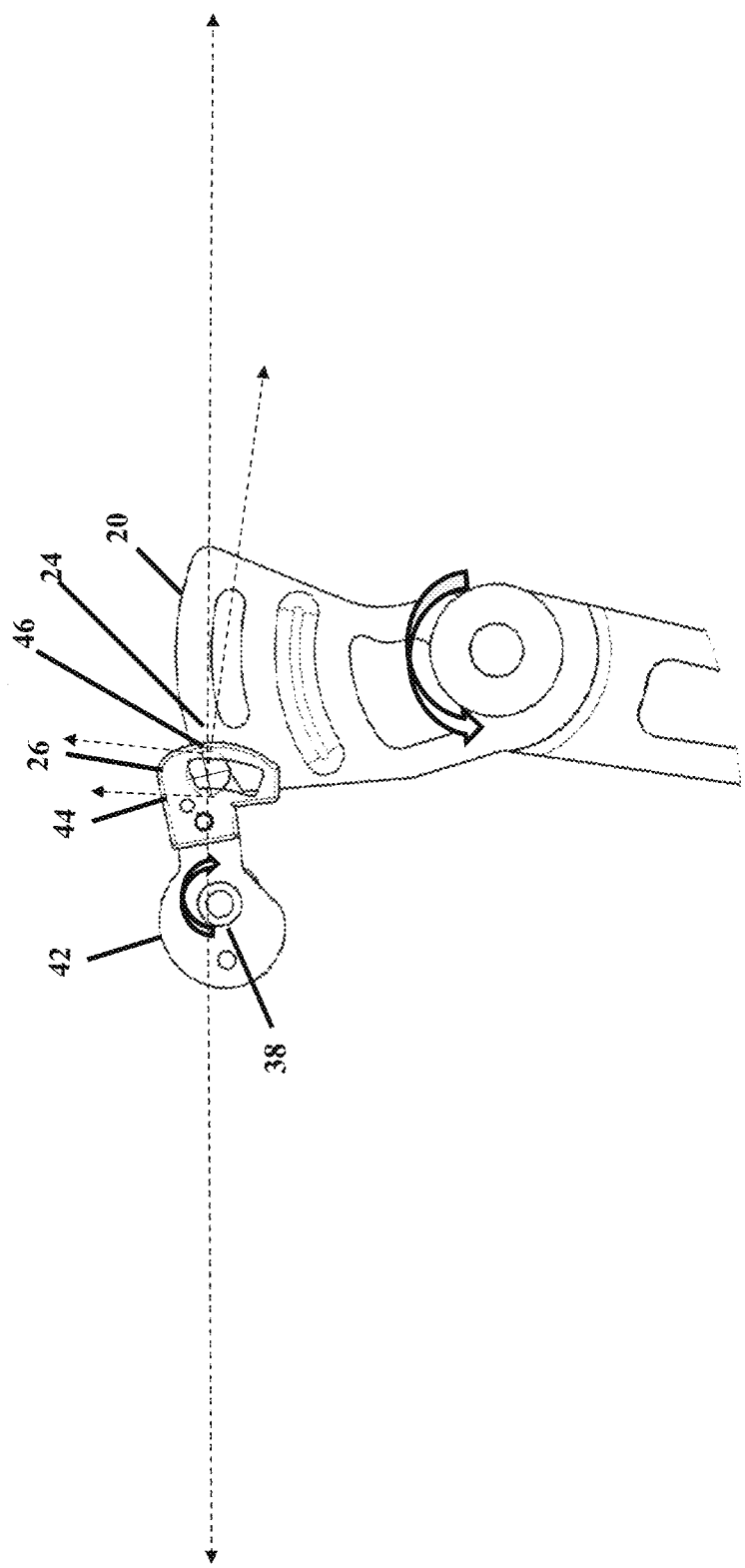
FIG. 10 is a view similar to FIG. 9 illustrating a change in force directions applied through the roller tending to slide the roller in a notch of the lever due to continued application of a force by the ratchet end against the roller of the pawl as a result of continued force being manually applied to the lever of the power actuation system.
Figure 11:
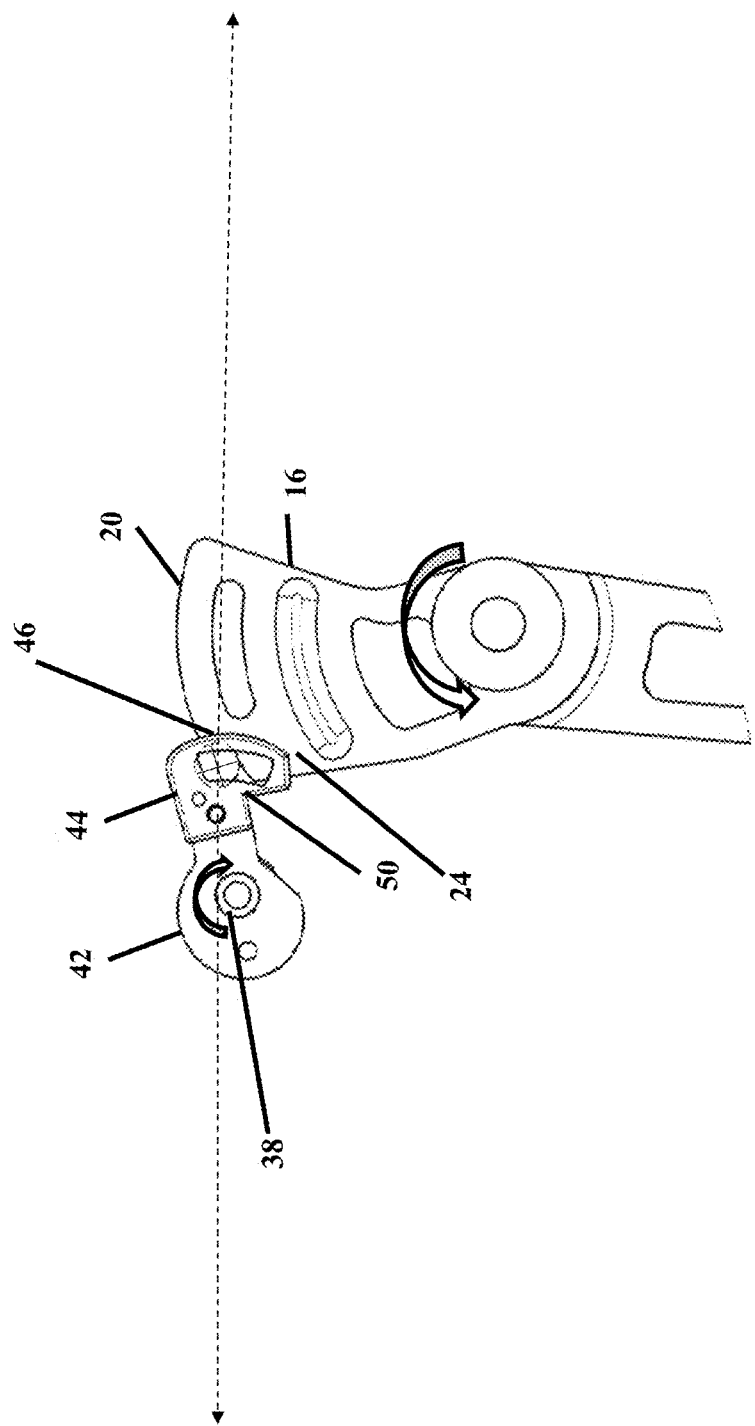
FIG. 11 is a view similar to FIG. 10 illustrating initial rotation of the roller along the notch of the lever of the power actuation system due to continued application of a force by the ratchet end against the roller of the pawl as a result of continued force being manually applied to the lever of the power actuation system.
Figure 12:
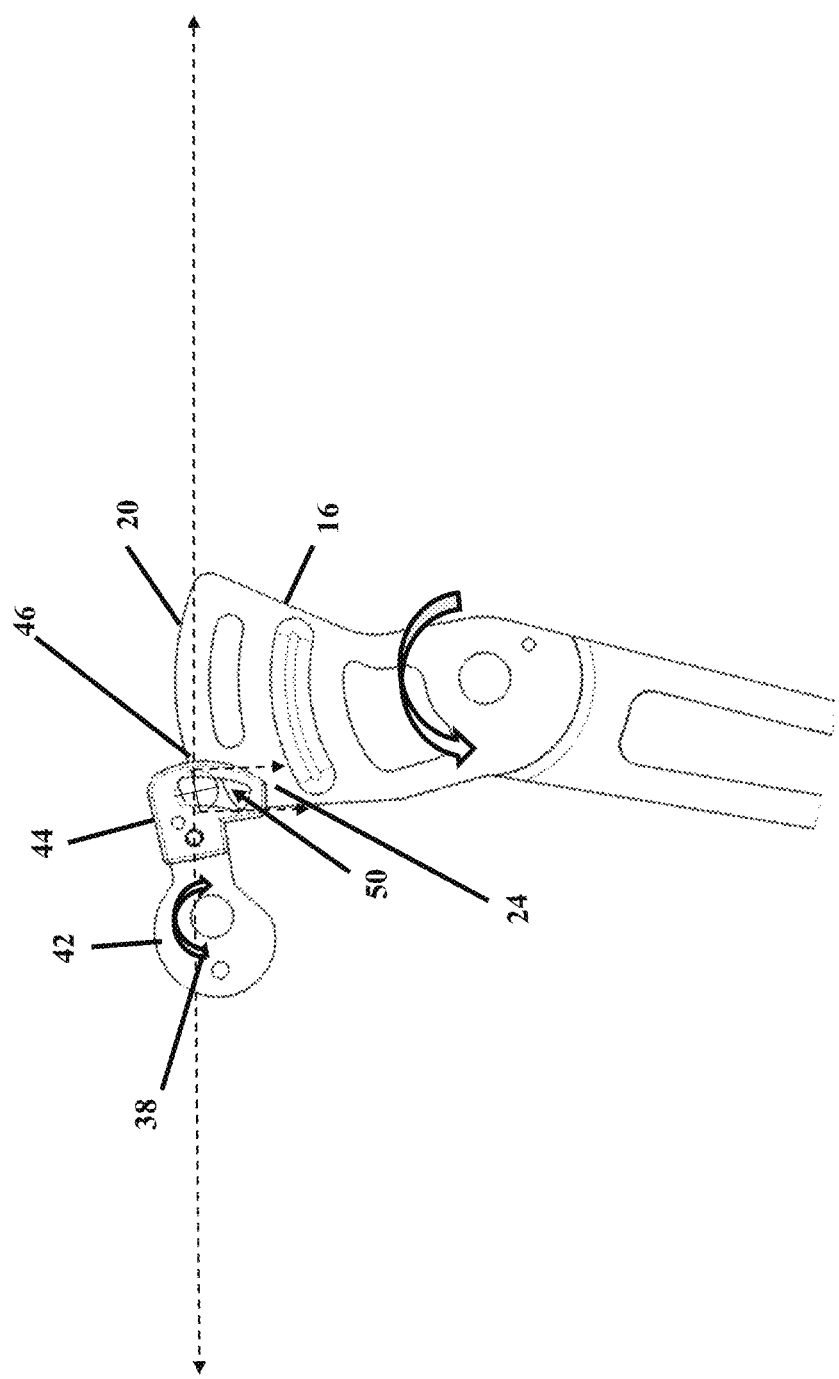
FIGS. 12 and 13 are views similar to FIG. 11 illustrating continued rotation of the roller along the notch of the lever of the power actuation system due to continued application of a force by the ratchet end against the roller of the pawl as a result of continued force being manually applied to the lever of the power actuation system.

Now, in a scenario where powered movement of the door 13 from the closed position to the open position is desired to be interrupted, such as when the door impacts an object/obstacle or is about to impact an object/obstacle, or for any other reason, the user can simply push and/or pull, depending on the orientation of the user relative to the door 13, the door 13 toward the closed position. When a force F (FIGS. 2 and 3), sufficient to overcome a threshold torque and a spring bias on roller 46 of pawl assembly 26, is applied to the door 13 against the direction of opening movement, as a result of the clutch assembly 40 and pawl assembly 26 thereof, the powered actuation system 10 can be readily and reliably manually overridden without causing damage to the actuation system 10. As the force F is applied, as shown in FIGS. 7-17, and as particularly shown in FIG. 9, the force applied to roller 46 via notch 50 or ratchet portion 24 is off-center from the rotational axis of pawl arm 42, which in turn creates a CCW moment on roller 46, thereby tending to establish pure or substantially pure rolling motion of roller 46. In FIGS. 10-13, and schematically in FIG. 3, it can be seen that roller 46 continues the rolling motion outwardly from notch 50, whereupon the roller 46 eventually exits notch 50, as shown in FIGS. 14-17, and traverses, such as rides for example, along an arcuate, generally smooth rolling end surface of free second end 20 of lever 16. It is to be recognized that during the manual overriding pivotal movement of lever 16 relative to driven gear 30, upstanding pin 64 of driven gear 30 is able to freely translate within slot 66 of lever 16 while pawl assembly 26 is in the lever releasing position, thereby permitting relative movement between lever 16 and driven gear 30 with no or negligible friction generated therebetween. Then, upon manually overriding the powered movement of door 13 and returning door 13 to a fully closed position, ECU can signal motor 32 to become energized, thereby causing gear member 34 to rotate in a CCW direction to pivot driven gear 30 in a CW direction until driven gear 30 is fully returned to its home position, whereupon the roller 46 of pawl assembly 26 rolls along free end 20 until it is returned, via the bias imparted by spring member 39, into notch 50 of ratchet portion 24, thus, rendering actuation system 10 ready for further powered actuation of door 13 (e.g. reset). FIG. 10 dashed lines represent offset forces acting on the pawl pivot 38 point increasing, with forces acting on the roller 46 tending to cause the roller 46 to slide. FIG. 11 illustrates an initial rotation of the roller 46 relative to the notch 50 with sliding forces acting on the roller 46 not present due to the roller 46 being in rotation. FIG. 12 illustrates a continued rotation of the roller 46 relative to the notch 50. FIG. 13 illustrates the roller 46 on the cusp of disengagement with notch 50. FIG. 14 illustrates a disengagement of the roller 46 from the notch 50. FIG. 16 illustrates the roller 46 illustratively ridding on the lateral surface of the ratchet 24, such that disengagement of the roller 46 from the notch 50 is maintained until such an operation, such as a manual or powered operation, acts to realign one of the roller 46 and notch 50 with one another. FIG. 17 dashed lines illustrate the forces acting on the pawl assembly 26, and in particular roller 36 due to the bias 39 imparted by a spring 39 acting on the pawl assembly 26.

With reference to FIG. 4, the two-way clutch embodiment, including the first clutch assembly 40 and the second clutch assembly 40' can be actuated via motor 32' as discussed above for motor 32 to cause a gear member 34', pivotally attached to mount member 14', to be rotatably driven, thereby causing driven gear 30' to be pivoted. In normal powered operation, while moving door 13 from its closed position to its open position, the powered pivoting movement of driven gear 30' causes pawl assembly 26 to rotatably drive lever 16', as discussed above for the one-way clutch embodiment. Accordingly, further discussion here is believed unnecessary.

Then, when desired to power the door 13 to the closed position, the motor 32' can again be selectively (e.g. motor can be intentionally turned on, intentionally turned off, or operated at any desired speed and desired torque output between such an on-state and an off-state) actuated via ECU to rotate the gear member 34' in an opposite CCW direction to that when opening the door 13, such that the gear member 34' drives driven gear 30' and pivots lever 16' in a CW direction to close door 13. Unlike the one-way clutch embodiment, during a powered closing operation of door 13, the second clutch assembly 40' and second pawl assembly 26' thereof acts to pivot lever 16' in the CW closing direction in similar fashion as the first clutch assembly 40 acts to pivot lever 16' in the CCW direction. Accordingly, repetition here describing such action is believed unnecessary.

Now, as with the one-way clutch embodiment, in a scenario where powered movement of the door 13 from the closed position to the open position is desired to be interrupted, such as when the door 13 impacts an object or is about to impact an object, or for any other reason, the user can simply push and/or pull, depending on the orientation of the user relative to the door 13, the door 13 toward the closed position. The manually applied force F, as shown in FIG. 4, acts to cause the first pawl assembly 26 to disengage the ratchet portion 24, such that the input end 20 is disengaged or disconnected from said output end 18, in the same fashion as discussed above for the one-way clutch embodiment, thereby allowing free pivotal movement of the lever 16' relative to driven gear 30', and thus, allow door 13 to be manually closed. Then, upon manually overriding the powered movement of door 13 and returning door 13 to a fully closed position, ECU can signal motor 32' to become energized, thereby causing gear member 34' to rotate in a CCW direction to pivot driven gear 30' in a CW direction until driven gear 30' is fully returned to its home position, whereupon first and second pawl assemblies 26, 26' are returned into their respective notches 50, 50' of ratchet portions 24, 24', thus, rendering actuation system 10' ready for further powered actuation of door 13.

Further, in a scenario where powered movement of the door 13 from the opened position to the closed position is desired to be interrupted, such as may be desired to prevent pinching or closing the door 13 on an object, by way of example and without limitation, the user can simply push and/or pull, depending on the orientation of the user relative to the door 13, the door 13 toward the open position. The manually applied force F, as shown in FIG. 4, acts to cause the second pawl assembly 26' to disengage the ratchet portion 24' in the same fashion as discussed above for the first pawl assembly 26, thereby allowing free pivotal movement of the lever 16' relative to driven gear 30', and thus, allow door 13 to be manually opened. Then, upon manually overriding the powered movement of door 13 and returning door 13 to a fully closed position, ECU can signal motor 32' to become energized, thereby causing gear member 34' to rotate in a CCW direction to pivot driven gear 30' in a CW direction until driven gear 30' is fully returned to its home position, whereupon first and second pawl assemblies 26, 26' are returned into their respective notches 50, 50' of ratchet portions 24, 24', thus, rendering actuation system 10' ready for further powered actuation of door 13.

In accordance with a further aspect, a method 1000 for providing manual interruption of the powered vehicle closure panel 13 that is pivotally coupled to a vehicle body 12 as the closure panel 13 is moving under power between open and closed positions is provided. The method includes the step 1003 of providing a lever 16, 16' having a first end 18 and an opposite second end 20 and configuring the first end 18 for attachment to one of the vehicle body 12 and the closure panel 13. Further, the step 1004 of providing a motor 32, 32' and configuring the motor 32, 32' for operable attachment to the other of the vehicle body 12 and the closure panel 13. Further yet, the step 1006 of operably coupling the motor 32, 32' with the lever 16, 16' via a driven gear 30, 30' so that the driven gear pivots 30, 30' in response to energization of the motor 32, 32'. Additionally, the step 1008 of providing at least one pawl assembly 26, 26' and supporting the pawl assembly 26, 26' on the driven gear 30, 30' for movement between a lever driving position whereat the pawl assembly 26, 26' is positioned to pivot the lever 16, 16' in response to pivotal movement of the driven gear 30, 30' and a lever releasing position whereat the pawl assembly 26, 26' is positioned to permit free pivotal movement of the lever 16, 16' relative to the driven gear 30, 30', and the step 1010 of configuring the pawl assembly 26, 26' to move from the lever driving position while the closure panel 13 is moving under power of the motor 32, 32' to the lever releasing position upon a user selectively applying a predetermined force to the closure panel 13. The method can further include providing the pawl assembly 26, 26' having a roller 46, 46' configured for rolling engagement with the lever 16, 16' as the pawl assembly 26, 26' moves between the lever driving position and the lever releasing position, thereby resulting in reliable and repeatable selective low friction movement of the pawl assembly between the lever driving position and the lever releasing position, as desired.

The foregoing description of the embodiments has been provided for purposes of illustration and description. It is not intended to be exhaustive or to limit the disclosure. Individual elements, assemblies/subassemblies, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power actuation system for a closure panel of a motor vehicle, comprising:

an extendable member having an output end configured for attachment to one of a vehicle body of the motor vehicle and said closure panel, and an input end;

a motor operably attached to one of the vehicle body or the closure panel, wherein the motor is attached to the vehicle body when the output end of the extendable member is configured for attachment to the closure panel, and the motor is attached to the closure panel when the output end of the extendable member is configured for attachment to the vehicle body, said motor being operable to move said extendable member in response to energization of said motor to move the closure panel between open and closed states;

a driven gear operably coupled to said extendable member; and at least one pawl assembly operably coupled to said driven gear for movement between a lever driving position, whereat the pawl assembly is positioned to engage a portion of said extendable member adjacent said input end of said extendable member and pivot said extendable member concurrently with said driven gear in response to pivotal movement of said driven gear, and a lever releasing position, whereat the pawl assembly is pivoted to permit free pivotal movement of said extendable member relative to said driven gear, said pawl assembly being biased in a single direction toward the lever driving position to pivot the pawl assembly toward the input end of the extendable member.

2. The power actuation system of claim 1, wherein said at least one pawl assembly has a carrier supporting a roller, said roller engaging said portion adjacent said input end of said extendable member for rolling movement along said portion during movement of said pawl assembly between the lever driving position and the lever releasing position.

3. The power actuation system of claim 2, wherein said at least one pawl assembly is mounted to said driven gear.

4. The power actuation system of claim 3, wherein said at least one pawl assembly includes a pair of said pawl assemblies.

5. The power actuation system of claim 4, wherein said pair of pawl assemblies are on opposite sides of said extendable member, wherein one of said pawl assemblies is positioned to engage said portion of said extendable member adjacent said input end of said extendable member and pivot said extendable member in a first direction in response to pivotal movement of said driven gear and the other of said pawl assemblies is positioned to engage said portion of said extendable member adjacent said input end of said extendable member and pivot said extendable member in a second direction opposite said first direction in response to pivotal movement of said driven gear.

6. The power actuation system of claim 5, further comprising a pair of notches recessed into said input end, each one of said pair of notches extending along a different one of said opposite sides of said lever from one another.

7. The power actuation system of claim 2, wherein said roller is spherical.

8. The power actuation system of claim 7, wherein said carrier has a slot configured for translation of said roller therein.

9. The power actuation system of claim 1, wherein said portion of said extendable member adjacent said input end of said extendable member includes a notch for each one of said at least one pawl assembly, said notch being recessed into said input end along a side of said lever.

10. The power actuation system of claim 1, wherein one of said extendable member and said driven gear has an upstanding pin and the other of said extendable member and said driven gear has a slot, said upstanding pin being disposed within said slot for translation therein during pivotal movement of said extendable member while said pawl assembly is in the lever releasing position.

11. A method for providing manual interruption of a powered vehicle closure panel pivotally coupled to a vehicle body as the closure panel is moving under power between open and closed positions, comprising:
   providing a lever having a first end and an opposite second end and configuring the first end for attachment to one of the vehicle body or the closure panel;
   providing a motor and configuring the motor for operable attachment to one of the vehicle body or the closure panel, wherein the motor is configured for operable attachment to the vehicle body when the first end of the lever is configured for attachment to the closure panel, and the motor is configured for operable attachment to the closure panel when the first end of the lever is configured for attachment to the vehicle body;
   operably coupling the motor with the lever via a driven gear and configuring the driven gear to pivot in response to energization of the motor; and
   providing at least one pawl assembly and supporting the at least one pawl assembly on the driven gear for movement between a lever driving position, whereat the at least one pawl assembly is positioned to pivot the lever in response to pivotal movement of the driven gear, and a lever releasing position, whereat the at least one pawl assembly is positioned to permit free pivotal movement of the lever relative to the driven gear, said pawl assembly being biased in a single direction toward the lever driving position to pivot the pawl assembly toward the lever, and configuring the at least one pawl assembly to move from the lever driving position while the closure panel is moving under power of the motor to the lever releasing position upon an obstacle applying a predetermined force to the closure panel.

12. The method of claim 11, further including providing the at least one pawl assembly having a roller configured for rolling engagement with the lever as the at least one pawl assembly moves between the lever driving position and the lever releasing position.

13. The method of claim 12, further including providing the at least one pawl assembly having a carrier supporting the roller for rolling movement along a portion of said lever adjacent an end of said lever during movement of said at least one pawl assembly between the lever driving position and the lever releasing position.

14. The method of claim 13, further including supporting the carrier on the driven gear for relative pivoting movement with the driven gear.

15. The method of claim 14, further including providing the at least one pawl assembly as a pair of said pawl assemblies.

16. The method of claim 15, further including positioning the pair of pawl assemblies on opposite sides of the lever and configuring one of the pawl assemblies to pivot the lever in a first direction in response to pivotal movement of the driven gear and configuring the other of the pawl assemblies to pivot the lever in a second direction opposite said first direction in response to pivotal movement of the driven gear.

17. The method of claim 16, further including providing a pair of notches recessed into the opposite second end along opposite sides of said lever.

18. The method of claim 12, further including providing the roller being spherical.

19. The method of claim 11, further including providing one of the lever and the driven gear having an upstanding pin and providing the other of the lever and the driven gear having a slot, and disposing the upstanding pin in the slot for translation therein during pivotal movement of the lever while the pawl assembly is in the lever releasing position.

20. A clutch assembly for a power actuation system for a closure panel of a motor vehicle, the power actuation system comprising an extendable member having a first end configured for attachment to one of a vehicle body of the motor vehicle or said closure panel, and a second end operably attached to one of the vehicle body and the closure panel, wherein the first end is operably attached to the vehicle body when the second end of the extendable member is configured for attachment to the closure panel, and the first end is operably attached to the closure panel when the second end of the extendable member is configured for attachment to the vehicle body, the second end configured to receive a driving force from a motor being operable to move said extendable member in response to energization of said motor to move the closure panel between open and closed states, the clutch assembly comprising:
   at least one pawl assembly operably coupled between an input gear and an output portion of the extendable member and configured for movement between a lever driving position, whereat the pawl assembly is positioned to engage together said input gear with said output portion and drive said extendable member concurrently with an energization of said motor, and a lever releasing position whereat the pawl assembly is movable to operably disengage said input gear from said output portion to permit free pivotal movement of said extendable member relative to said motor, said pawl assembly being biased in a single direction toward the lever driving position to pivot the pawl assembly toward the extendable member.

* * * * *